US007034655B2

(12) United States Patent
Magner et al.

(10) Patent No.: US 7,034,655 B2
(45) Date of Patent: *Apr. 25, 2006

(54) KEYPAD MODULE AND METHOD FOR ELECTRONIC ACCESS SECURITY AND KEYLESS ENTRY OF A VEHICLE

(75) Inventors: Dave Magner, Calmar, IA (US); Rick McIntosh, Altoona, IA (US); Julie M. Houdek, New Hampton, IA (US)

(73) Assignee: Tri/Mark Corporation, New Hampton, IA (US)

( * ) Notice: Subject to any disclaimer, the term of this patent is extended or adjusted under 35 U.S.C. 154(b) by 463 days.

This patent is subject to a terminal disclaimer.

(21) Appl. No.: 10/213,409

(22) Filed: Aug. 6, 2002

(65) Prior Publication Data

US 2004/0027238 A1 Feb. 12, 2004

(51) Int. Cl.
*G05B 19/00* (2006.01)

(52) U.S. Cl. .................... 340/5.54; 307/10.4; 340/5.51

(58) Field of Classification Search ............... 340/5.54, 340/5.64, 5.67, 5.72, 5.22, 426.36, 543; 307/10.2, 307/4; 701/2, 36

See application file for complete search history.

(56) References Cited

U.S. PATENT DOCUMENTS 4,205,325 A 5/1980 Haygood
4,206,491 A 6/1980 Ligman
4,488,056 A 12/1984 Mochida
4,688,036 A 8/1987 Hirano
4,742,327 A * 5/1988 Burgess et al. ........ 340/426.36
4,942,393 A 7/1990 Waraksa
5,109,221 A 4/1992 Lambropoulos
5,113,182 A 5/1992 Suman
5,148,348 A 9/1992 White
5,223,844 A * 6/1993 Mansell et al. ........ 342/357.07
5,278,547 A 1/1994 Suman
5,402,322 A 3/1995 Kunkler
5,442,341 A 8/1995 Lambropoulos
5,467,080 A 11/1995 Stoll
5,481,253 A * 1/1996 Phelan et al. ............. 340/5.67
5,650,774 A 7/1997 Drori
5,669,522 A 9/1997 Million
5,767,588 A 6/1998 Nakaya
5,907,195 A 5/1999 Issa
5,973,611 A 10/1999 Kulha
6,031,465 A 2/2000 Burgess
6,084,317 A * 7/2000 Wolfe et al. ............... 307/10.4

* cited by examiner

*Primary Examiner*—Michael Horabik
*Assistant Examiner*—William Bangachon
(74) *Attorney, Agent, or Firm*—McKee, Voorhees & Sease, P.L.C.

(57) ABSTRACT

The present invention is a keypad module for a vehicle. The keypad module includes a housing having a front side, a back side, and side members, the front side having a flange adapted for mounting to a vehicle, a plurality of buttons operatively connected to the housing and recessed in the front side, a circuit board disposed within the housing, an intelligent control mounted to the circuit board and electrically connected to the plurality of buttons, and a network transceiver electrically connected to the intelligent control, the intelligent control adapted to transmit a vehicle access message through the network transceiver. The present invention also includes a method.

45 Claims, 15 Drawing Sheets

KEYPAD MODULE AND METHOD FOR ELECTRONIC ACCESS SECURITY AND KEYLESS ENTRY OF A VEHICLE

CROSS-REFERENCE TO RELATED APPLICATIONS

This application is related to application Ser. No. 10/213,461, now U.S. Pat. No. 6,789,003.

BACKGROUND OF THE INVENTION

This invention relates to a keypad module for providing secured access to a vehicle or for otherwise controlling vehicle functions.

There have been some attempts to provide for secured access through a keypad associated with a door, although there has been more interest in providing remote keyfob transmitters. One example of a system using a keypad is disclosed in U.S. Pat. No. 5,278,547 to Suman et al. In Suman, a keypad is directly connected to a microcontroller that controls vehicle functions. There are problems that relate connecting all vehicle inputs (including a keypad) and all vehicle outputs to a single microcontroller. In particular, the amount of wiring that needs to be performed is expensive, makes repairs more difficult and costly, and makes it more difficult to customize. The method of customization shown in the prior art is to prewire the vehicle harness and then choose which features to include. This results in the vehicle harness being prewired for all features. This would allow all vehicles, regardless of options installed, to use the same wiring harness but also limits the options available.

These problems are particularly apparent as they relate to the manufacture of non-automotive vehicles. Many such vehicles are far more complicated than cars. For example, recreational vehicles (RVs), trucks, specialty vehicles, emergency vehicles, construction equipment, agricultural equipment and other types of vehicles may be large in nature and have numerous features or amenities that it would be useful and desirable to control via one or more keypads. These types of vehicles may have multiple entry doors, multiple compartments on the inside or outside of the vehicles, gas compartment doors, maintenance doors, various lighting fixtures on the inside or outside of the vehicle, and numerous other functions some of which may be highly specialized. These vehicles are more likely to need greater customization in the placement of one or more keypads and in the vehicle functions controlled by each keypad.

Therefore, it is a primary object, feature, or advantage of the present invention to improve upon the state of the art.

It is a further object, feature, or advantage of the present invention to provide a modular solution for keypad control of a vehicle.

Another object, feature, or advantage of the present invention is to provide a keypad module that does not require redesign of the vehicle's wiring harness.

Yet another object, feature, or advantage of the present invention is to provide a keypad module that provides for network communication with other aspects of the vehicle.

It is a further object, feature, or advantage of the present invention to provide a keypad module that can control vehicle functions that include more than merely an entry door.

It is a still further object, feature, or advantage of the present invention to provide a keypad module that can be placed in any number of customizable positions on a vehicle.

Another object, feature, or advantage of the present invention is to provide a keypad module that is versatile in the manner in which it is mounted to the vehicle.

A further object, feature, or advantage of the present invention is to provide a keypad module that provides for user feedback when a key or button is pressed.

These and/or other objects, features, and/or advantages of the present invention will become apparent from the specification and claims that follow.

SUMMARY OF THE INVENTION

The present invention is a keypad module for a vehicle. According to one aspect of the invention the keypad module includes a housing having a front side, a back side, and side members, the front side having a flange adapted for mounting to a vehicle, a plurality of buttons operatively connected to the housing and recessed in the front side, a circuit board disposed within the housing, an intelligent control mounted to the circuit board and electrically connected to the plurality of buttons, and a network transceiver electrically connected to the intelligent control, the intelligent control adapted to transmit a vehicle access message through the network transceiver.

According to another aspect of the present invention, a keypad module of the present invention includes a housing having a front side, a back side, and side members, the front side having a flange adapted for mounting to a vehicle, a plurality of buttons operatively connected to the housing and recessed in the front side, each of the plurality of buttons with internal resistive features (domes) such that a user receives tactile feedback, a circuit board disposed within the housing, an intelligent control mounted to the circuit board and electrically connected to the plurality of buttons, a network transceiver electrically connected to the intelligent control, the intelligent control adapted to transmit a vehicle access message through the network transceiver, at least one lighting device electrically connected to the intelligent control for providing visual feedback associated with each of the plurality of buttons, and an audio circuit electrically connected to the intelligent control for providing audio feedback associated with a user pressing one of the plurality of buttons.

According to another aspect of the present invention, a method is disclosed for providing secured access to a vehicle with a vehicle entry and a keypad module operatively connected to the vehicle and associated with the vehicle entry, the keypad module having a plurality of buttons. The method includes receiving a user selection of at least one button, providing tactile, visual, and audio feedback to the user of the user selection, generating a security code at least partially based on the user selection, generating a vehicle access message by the keypad module, the vehicle access message including the security code, sending the vehicle access message over a network to a remote device within the vehicle, and unlocking a lock associated with the vehicle entry.

According to another aspect of the present invention, a method is disclosed for providing a plurality of sealing features to protect the keypad from environmental contaminants. Environmental contaminants may be normal occurring stimuli such as rain, snow, hail, cleaning solvents or may be rare stimuli such as unleaded gasoline, diesel fuel, or acids. Preferable these sealing features include protection from the front side and rear side of the keypad as well as internal PCB and connector protection.

FIGS. *7a–7f* provide schematic diagrams of one embodiment of the keypad module of the present invention.

Figure 8:
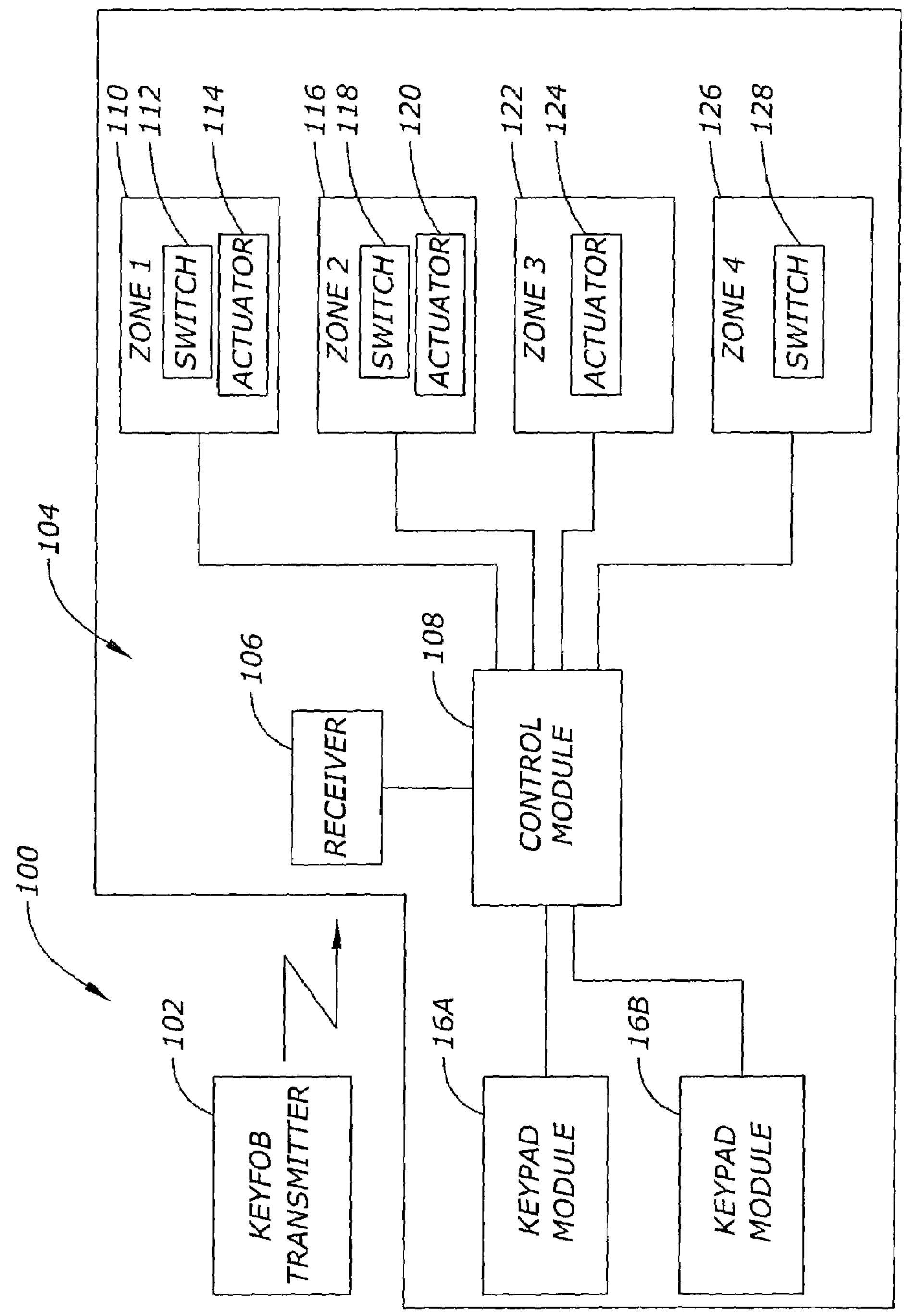

FIG. 8 is a block diagram showing the keypad module of the present invention within a vehicle system.

Figure 9:
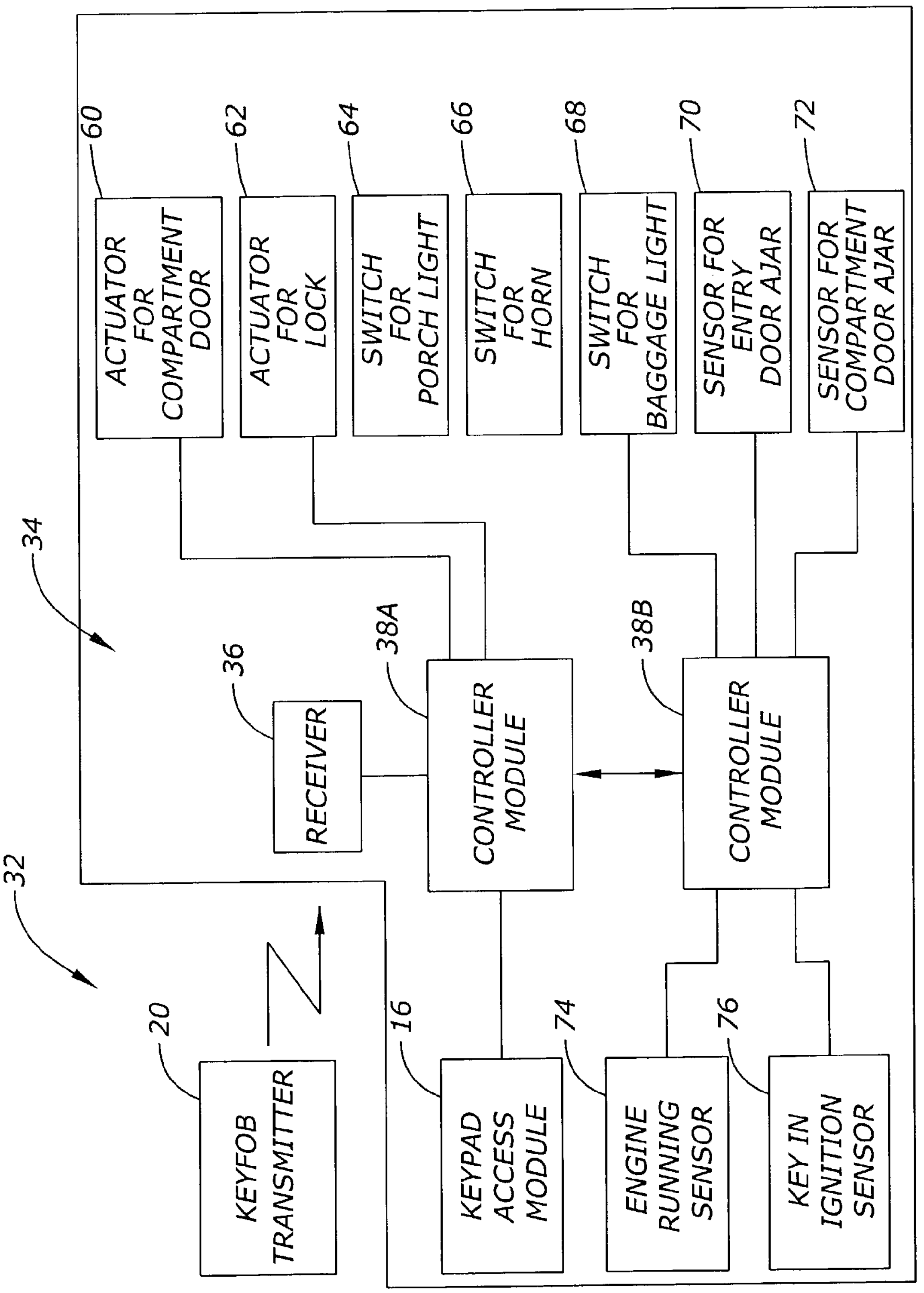

FIG. 9 is a block diagram showing the keypad module of the present invention within a vehicle system in a different configuration.

Figure 10:
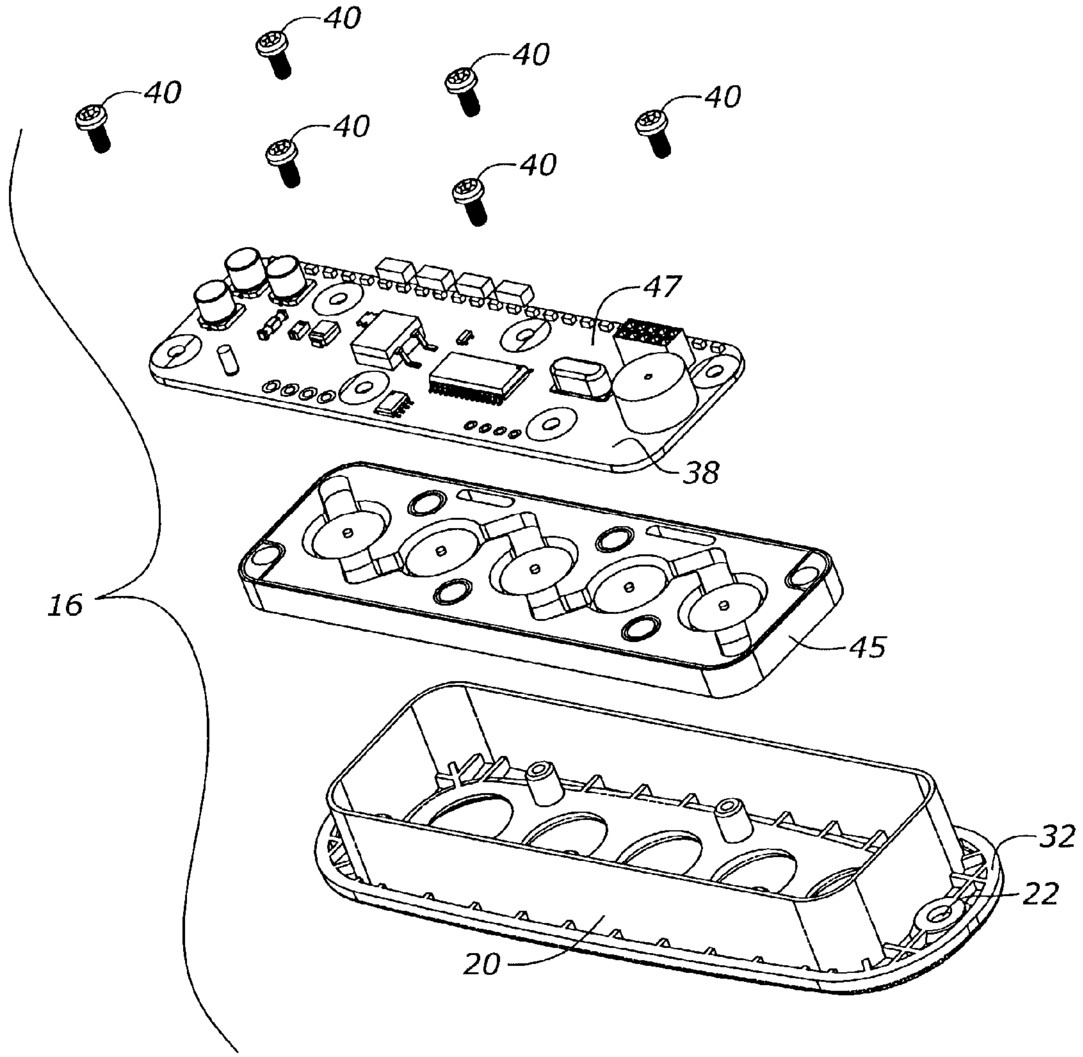

FIG. 10 is an exploded perspective view showing the keypad module with the circuit board, an elastomer layer, and the housing.

DETAILED DESCRIPTION OF THE INVENTION

Figure 1:
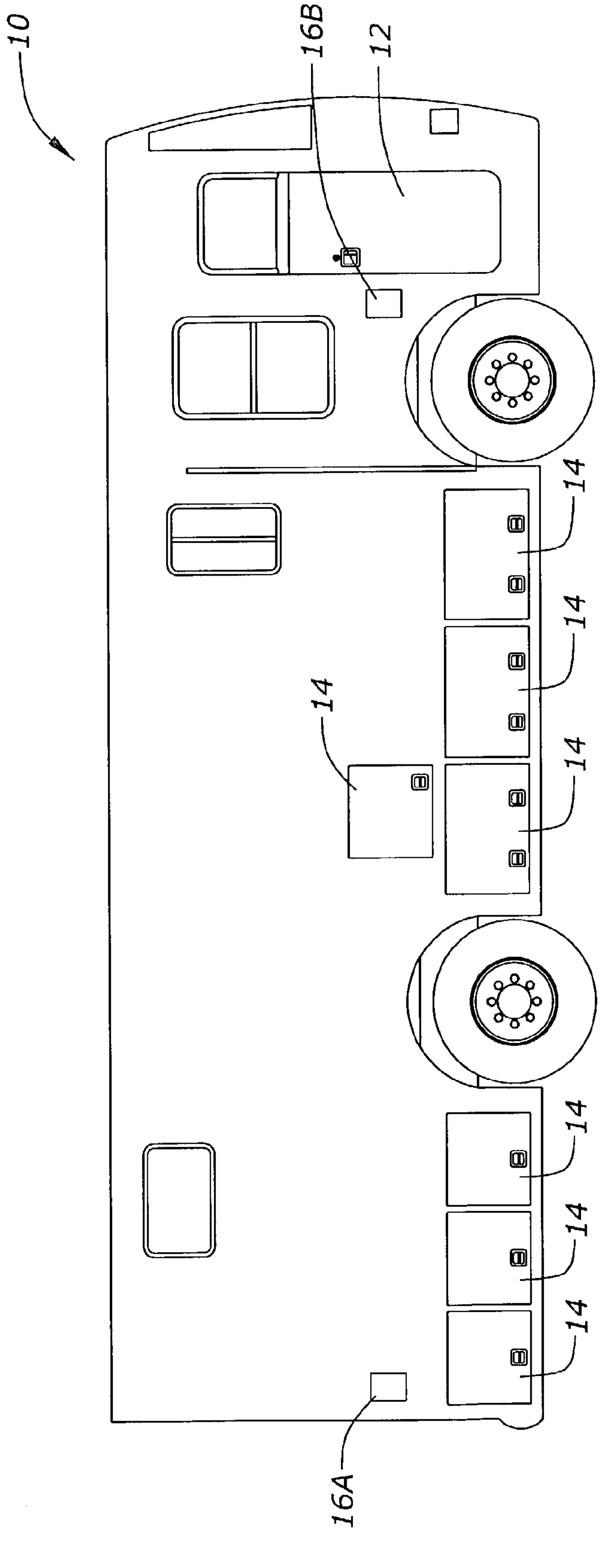
FIG. 1 is a side view of a vehicle equipped with a plurality of keypad modules according to one embodiment of the present invention.

The present invention provides for a keypad module to be used in a vehicle. FIG. 1 illustrates a vehicle 10 according to one embodiment of the present invention. The vehicle 10 shown is an RV, however, the present invention is in no way limited for use in an RV. The present invention can be used in numerous applications, including vehicles such as semi-truck tractors, ambulances, construction equipment, agricultural equipment, and other types of vehicles. The vehicle 10 shown has a passenger door 12 and a number of different compartment doors 14. The compartment doors 14 are spread out along the passenger side of the vehicle 10. Two different keypad modules 16A and 16B are shown. The first keypad module 16A and the second keypad module 16B are located on different ends of the vehicle 10 with the second keypad module 16B being located near the passenger door 12 and the first keypad module 16A being located near the rear most compartment doors 14. An operator of the vehicle 10 can use either the first keypad module 16A or the second keypad module 16B to unlock the passenger door 12 and enter the vehicle 10 or unlock various compartment doors 14, including the rear most doors 14. Addition provisions within the system and vehicle can provide for door actuating or opening. Although only two keypad modules 16A and 16B are shown, the present invention contemplates that numerous keypad modules 16 can be provided. The present invention also contemplates that the keypad modules 16 can be placed in various positions on the vehicle such as may be convenient or desirable.

Figure 2:
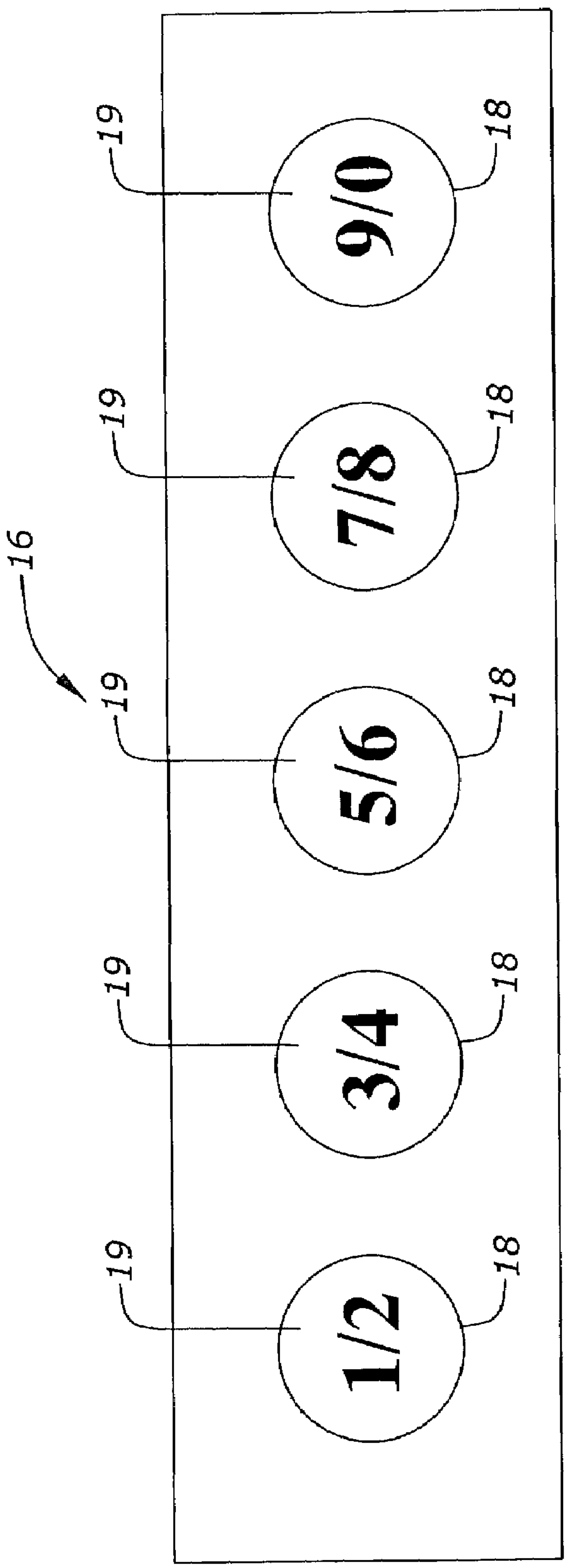
FIG. 2 is a front view of a keypad module in a horizontal orientation according to one embodiment of the present invention.
Figure 3:
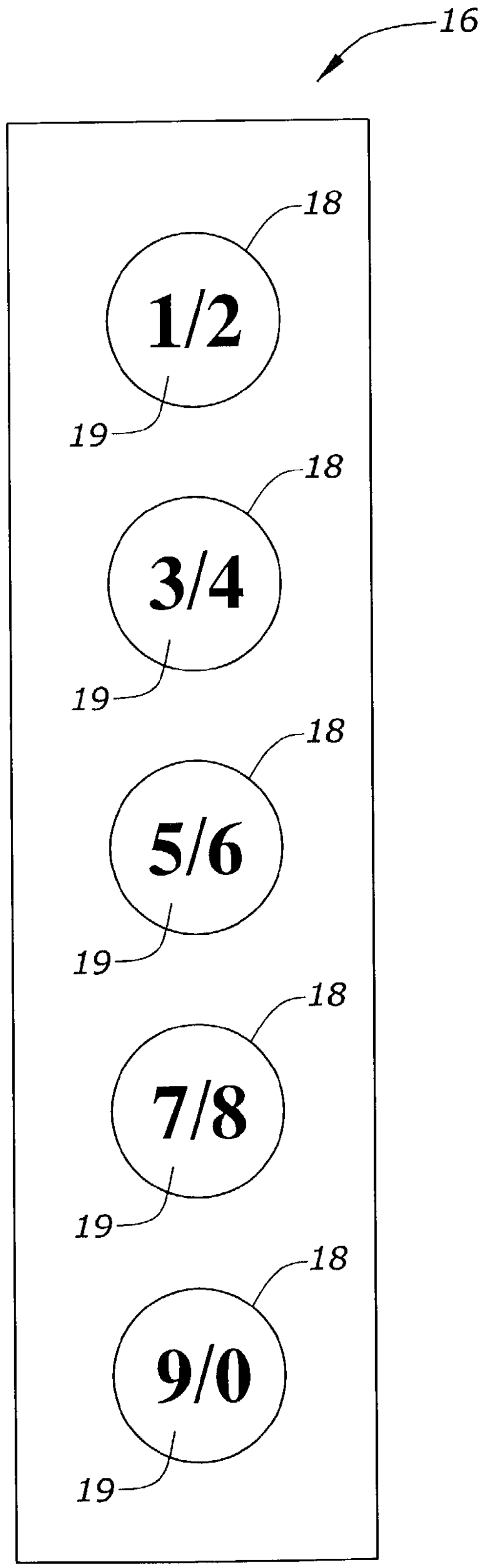
FIG. 3 is a front view of a keypad module in a vertical orientation according to another embodiment of the present invention.

FIG. 2 provides a front view of one embodiment of the keypad module of the present invention. A plurality of buttons 18 are shown. Each of the buttons has a label 19. Preferably, each of the buttons is labeled with a number or numbers for identifying purposes, in order to provide for a convenient and intuitive interface to the vehicle operators, however, the present invention contemplates that other identifiers or no identifiers at all can be used. The keypad module of the present invention is preferably versatile such that it can be mounted in multiple orientations, such as the horizontal orientation shown in FIG. 2 or the vertical orientation shown in FIG. 3.

Figure 4:
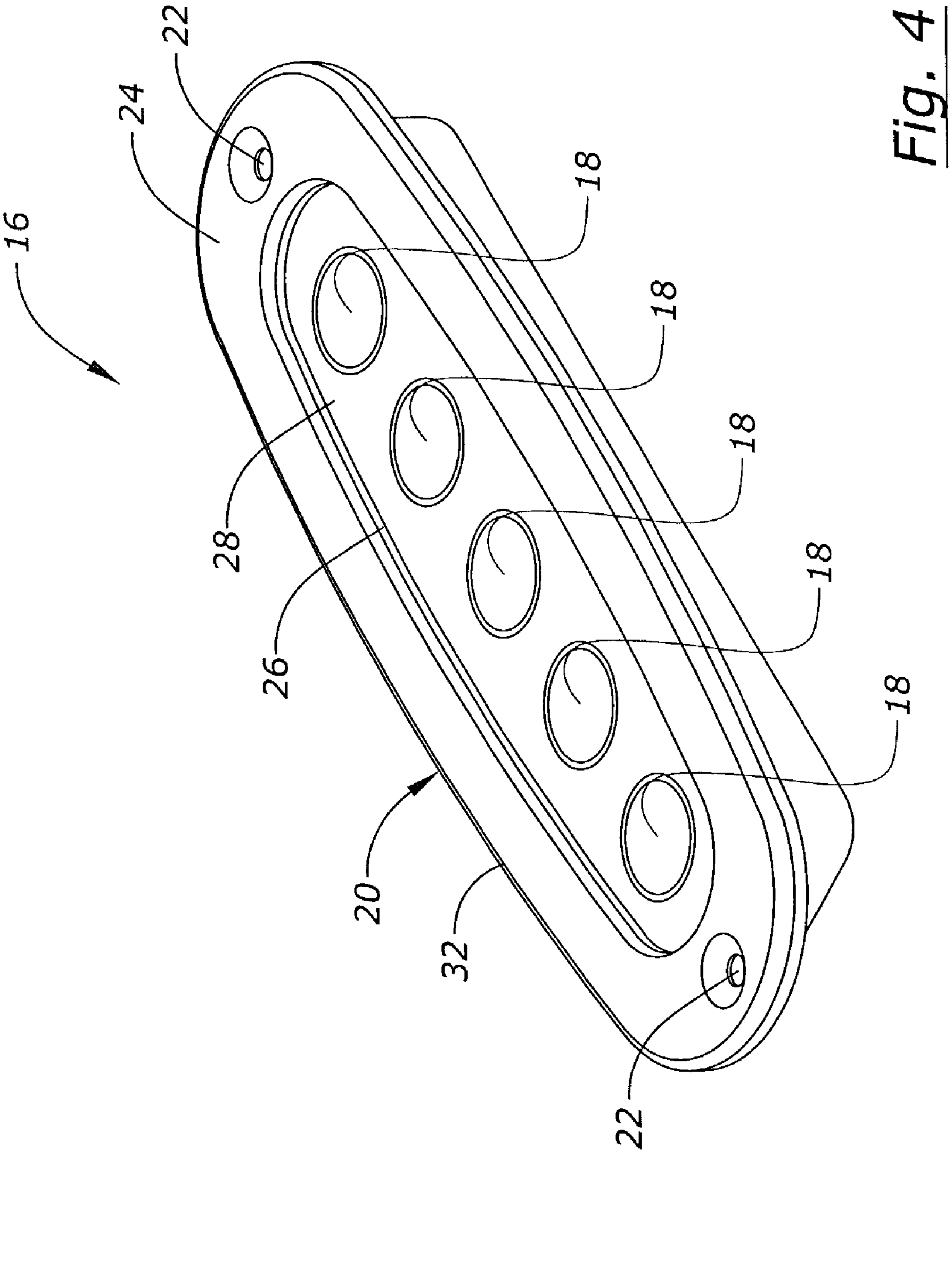
FIG. 4 is a front perspective view of one embodiment of the keypad module of the present invention.

FIG. 4 provides a perspective view of the keypad module 16. The keypad module 16 is adapted for mounting to a vehicle. The keypad module includes a housing 20 having a front side 24. The front side 24 has a flange 32 that is adapted to mounting to a vehicle. As shown, there are apertures 22 on opposite ends of the flange 32 for connecting the keypad module 16 to a vehicle using external fasteners. In addition, the present invention contemplates that rear details, such as externally thread studs, can be used for tamper resistant mounting. The front side 24 also has a recessed portion 28. The buttons 18 are placed within the recessed portion 28. Each of the buttons preferably has pressing resistant features to provide tactile feedback. Also, preferably, each of the buttons is backlit so that it can bee seen in different lighting conditions.

Figure 5:
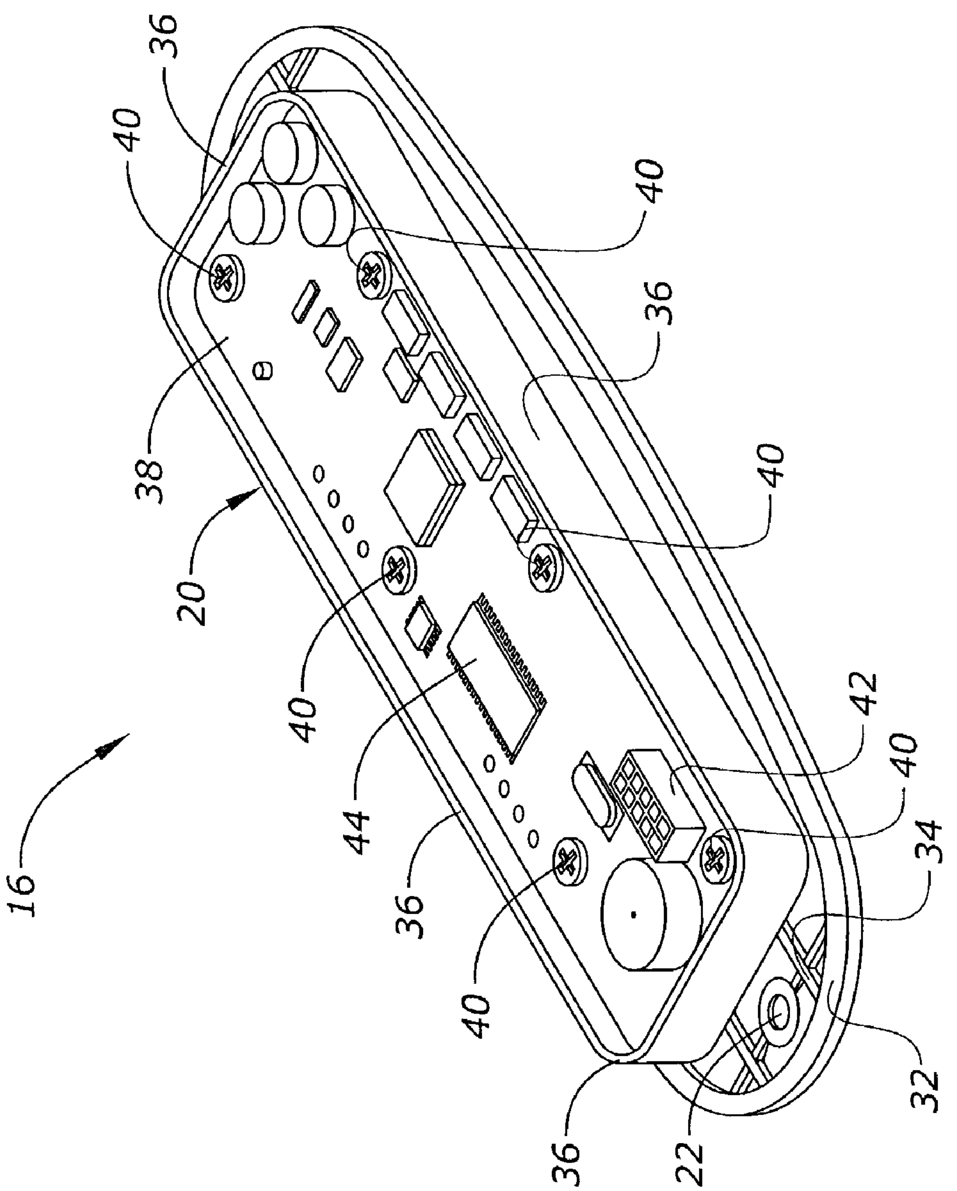
FIG. 5 is a rear perspective view of one embodiment of the keypad module of the present invention.

FIG. 5 provides a perspective view of the opposite end of the keypad module 16. The back side 34 of the keypad module 16 includes a plurality of sidewalls 36. A printed circuit board (PCB) 38 is placed within the housing 20. The printed circuit board 38 is operatively connected to the housing 20 with fasteners 40. The printed circuit board 38 includes an intelligent control 44 such as a PIC 16F873 microcontroller available from Microchip Technology, Incorporated. In addition, a connector 42 is shown for connecting the keypad module 16 and power connections to a network.

FIG. 10 provides an exploded view of the keypad module 16. In FIG. 10, a sealing member such as an elastomer layer 45 is sandwiched between the circuit board 38 and the housing 20. The present invention provides for improved sealing through use of the elastomer layer 45. The elastomer layer can be silicone based or of other types. Preferably, the elastomer layer 45 includes ridges to improve sealing. The elastomer layer 45 can also include a protective coating for further increasing durability and chemical resistively of the keypad module 16.

The circuit board is preferably covered with a silicone, epoxy, or other sealing compound 47. The sealing compound provides rigidity as well as sealing. Preferably, the sealing compound is at least approximately ¼ inches in thickness, however, the present invention contemplates that lesser thicknesses can be used. The sealing compound can also be used to seal the connections of cables exiting from the keypad module 16 to further protect the circuit board 38 from the environment or contaminants.

Figure 6:
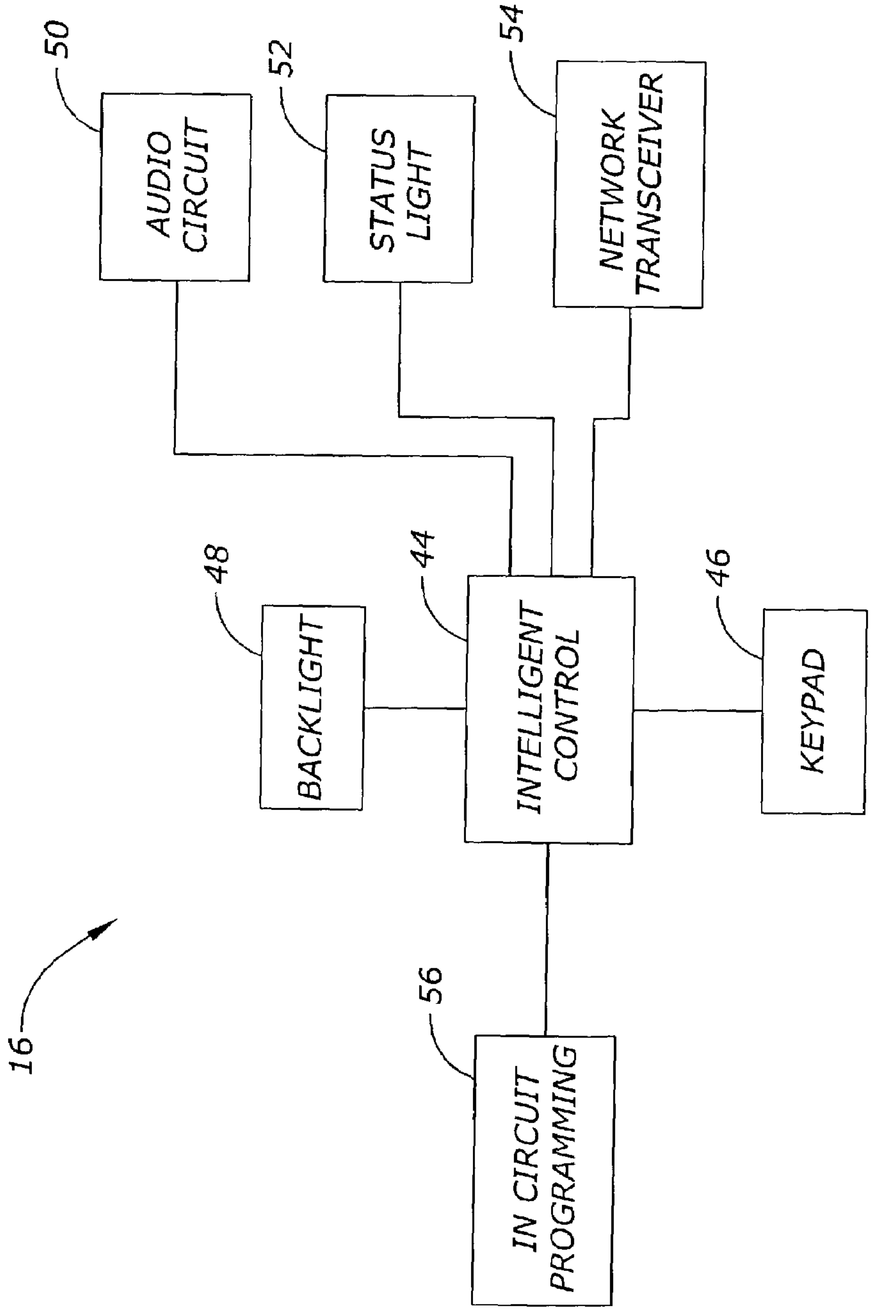
FIG. 6 is a block diagram of a keypad module according to one embodiment of the present invention.

FIG. 6 provides a block diagram of the electronics of the keypad module 16 according to one embodiment of the present invention. The intelligent control 44 is electrically connected to the keypad 46 that includes a plurality of buttons or keys. The intelligent control 44 is also electrically connected to a backlight circuit 48 associated with the keypad 46. Preferably the intelligent control 44 provides pulse width modulation brightness/power control of the backlight circuit 48 that can include one or more lighting devices. Also, preferably, the intelligent control 44 provides power management features for the keypad backlights. The power management features include means to automatically deactivate backlighting after a duration of time with no button pressing or when vehicle power supply voltage is drained to a predetermined threshold amount. The presence or absence of backlighting or the intensity of lighting can be used to provide visual feedback of the pressing of a button associated with the keypad 46.

An audio circuit 50 that can contain a buzzer is also electrically connected to the intelligent control 44. The audio circuit 50 can be used to provide audio feedback to indicate that one or more buttons associated with the keypad 46 have been pressed.

The backlight circuit 48 or separate status lights 52 can also be electrically connected to the intelligent control. The backlight circuit 48 or separate status lights 52 can be used to indicate error conditions of other aspects of the status of the keypad module 16.

A network transceiver 54 is also electrically connected to the intelligent control 44. Preferably the network transceiver 54 uses a standard RS-485 transceiver. The network preferably uses the physical layer of the J1708 standard that has low electromagnetic interference (EMI) characteristics. The network preferably supports at least 20 nodes at a baud rate of 9600. It is preferred that cabling to other devices on the network uses at least 18 gauge wire, twisted at 1 turn per inch. The operational cable limit then becomes approximately 130 feet.

Preferably, an in-circuit programming circuit 56 is also electrically connected to the intelligent control 44. This allows the intelligent control to be programmed without removing the intelligent control 44 from the sealed keypad housing. Thus updates to the programming can be made conveniently and inexpensively.

Figure 7A:
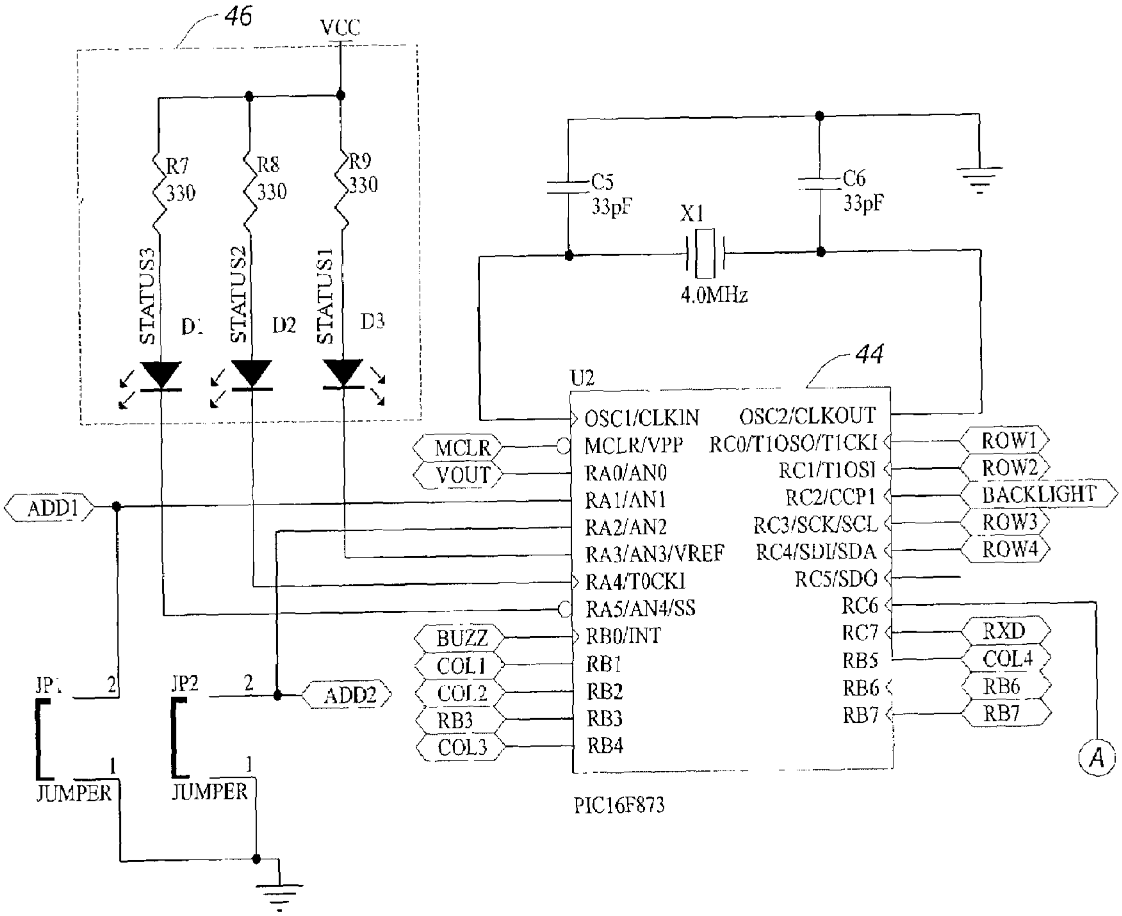
Figure 7B:
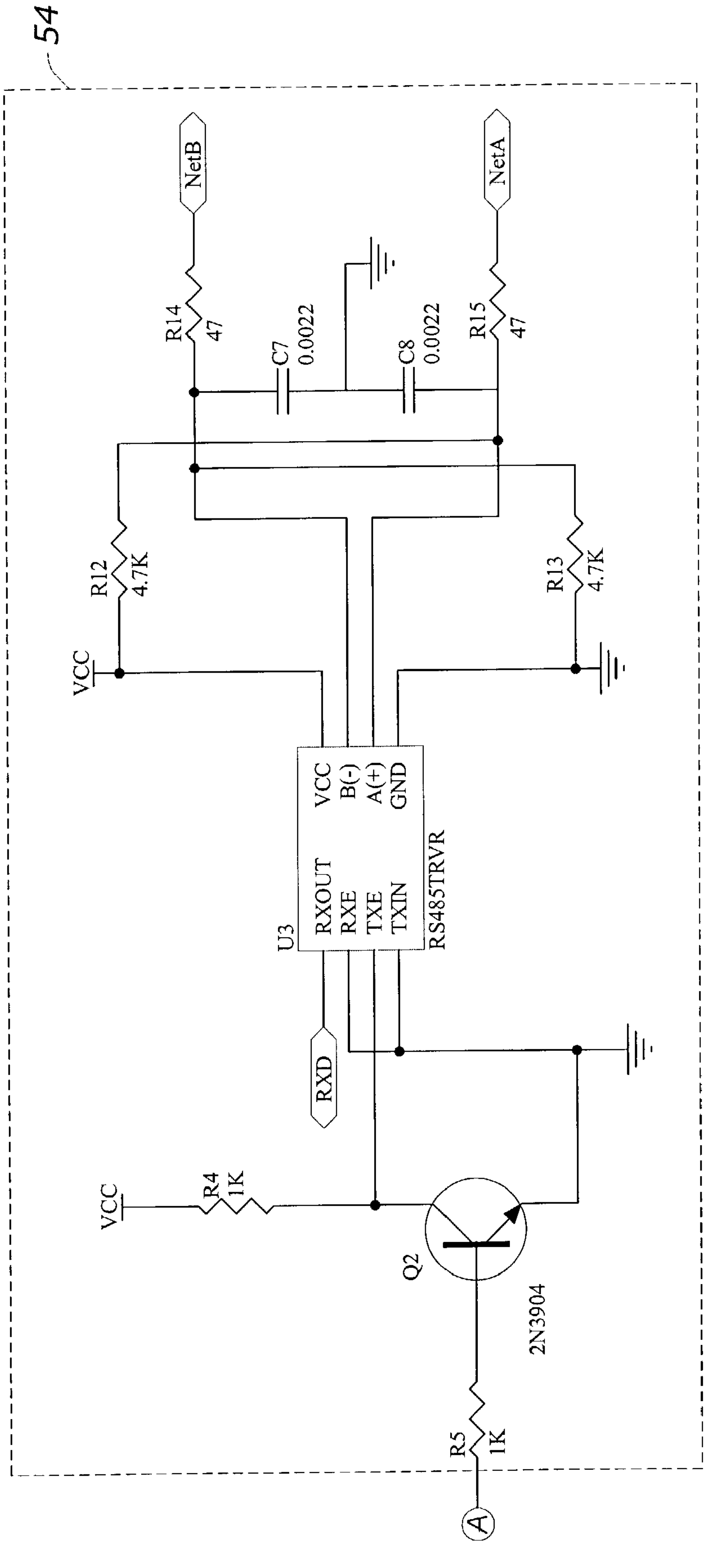
Figure 7C:
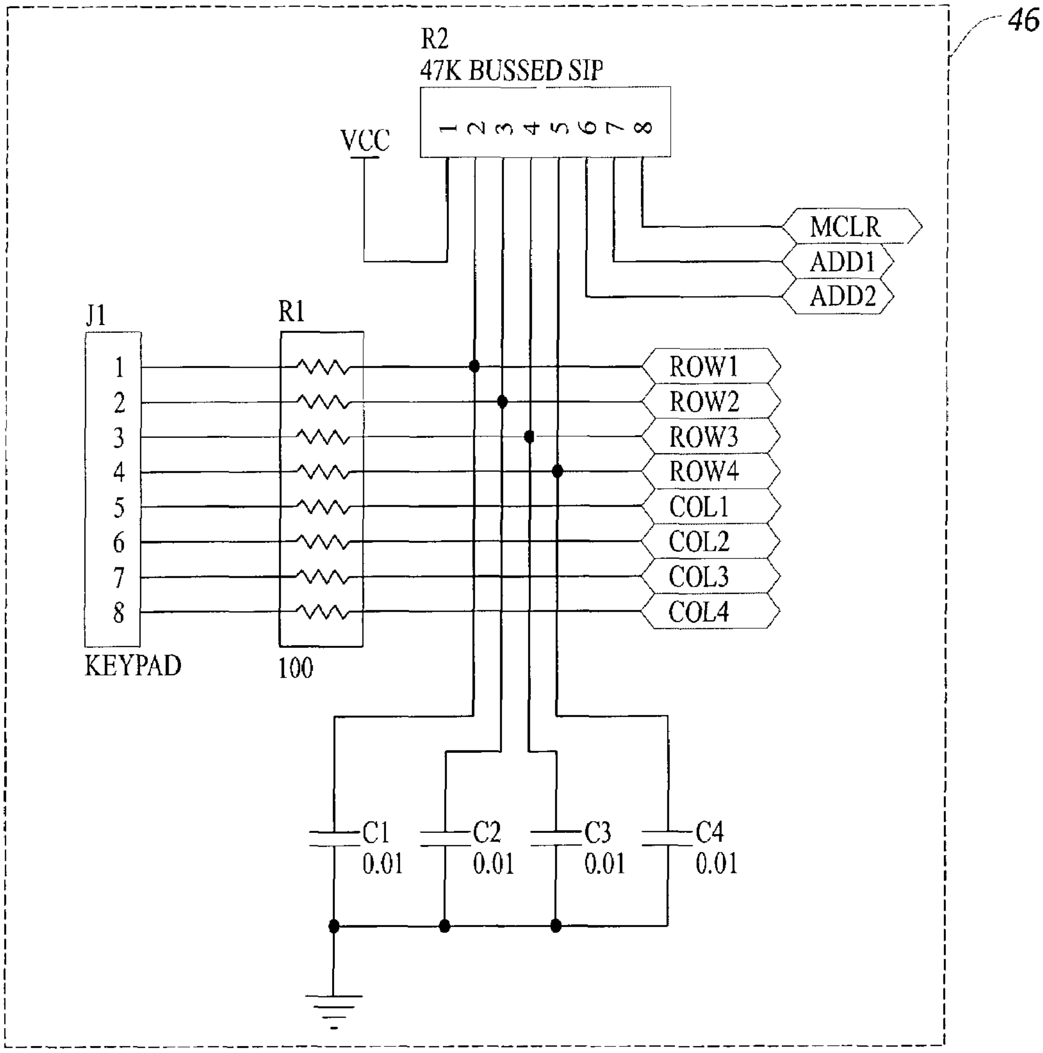
Figure 7D:
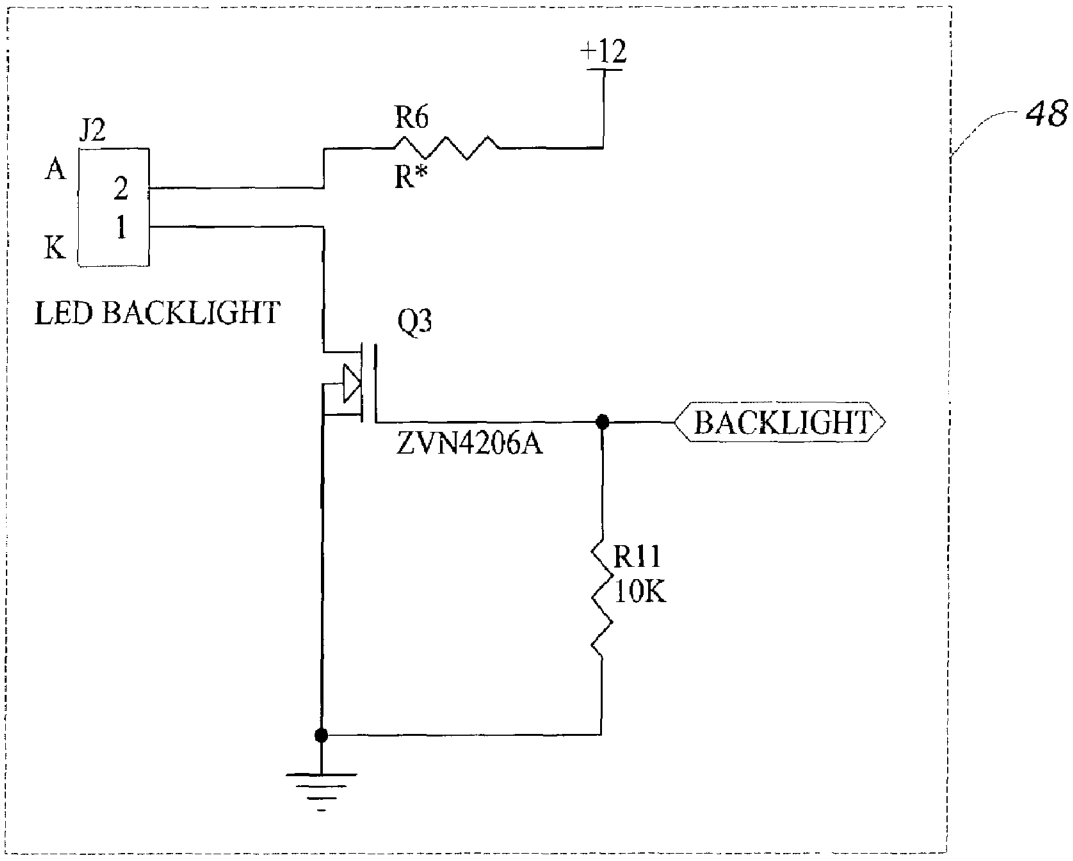
Figure 7E:
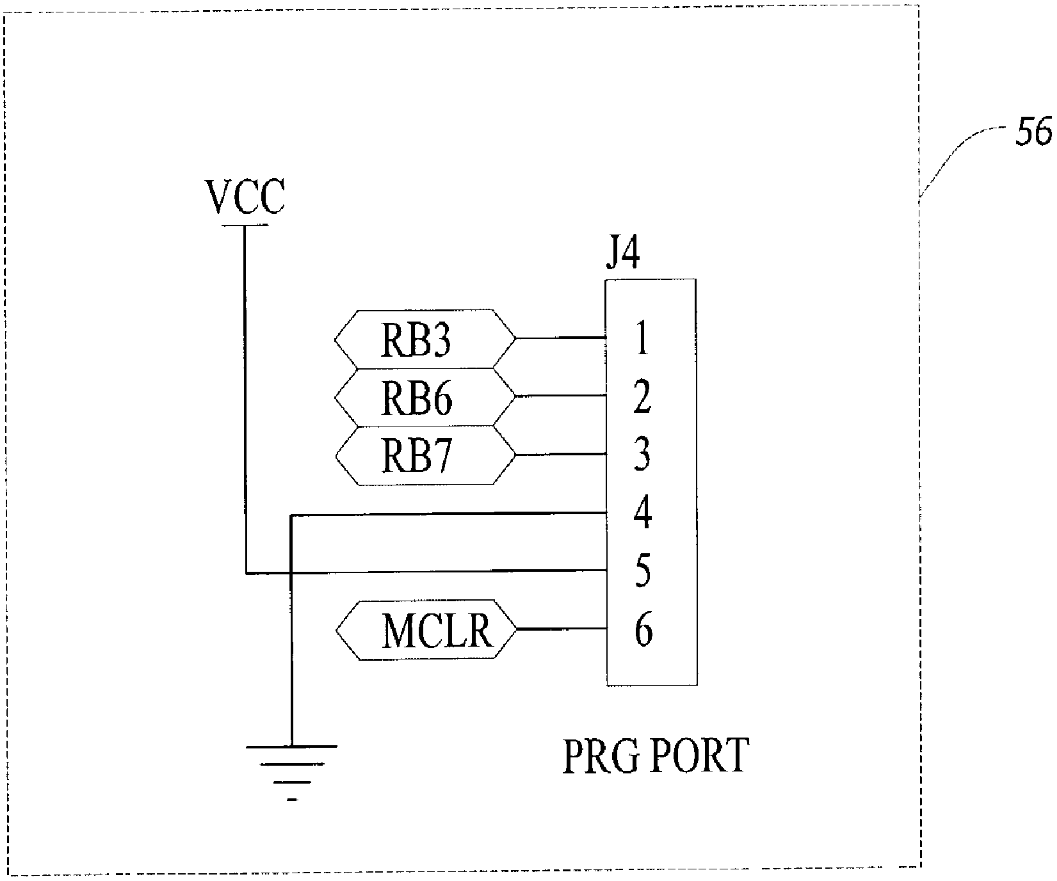
Figure 7F:
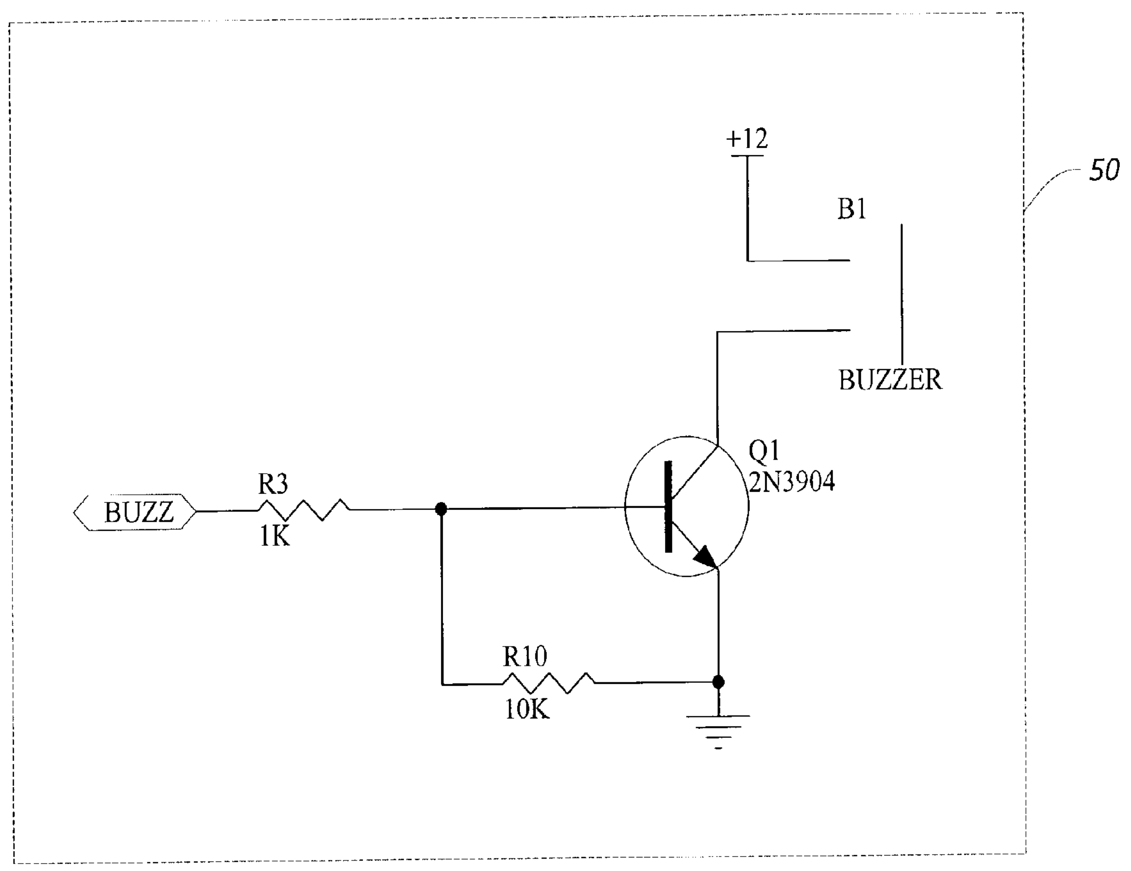

FIGS. 7*a*–7*f* provide more detailed electrical schematics of the keypad module of the present invention. In FIG. 7*a*, the intelligent control 44 is shown electrically connected to the status lights 52. In FIG. 7*b* the network transceiver 54 is shown. FIG. 7*c* illustrates the keypad circuit 46. FIG. 7*d* illustrates a lighting device backlight circuit 48. FIG. 7*e* illustrates an in-circuit programming circuit 50. FIG. 7*f* illustrates an audio circuit 50 with a buzzer, although other types of audio circuits can be used if present.

FIG. 8 provides a block diagram showing one embodiment of the relationship of the keypad module of the present invention to other aspects of the vehicle. The system 100 includes a key fob transmitter unit 102 and a vehicle subsystem 104. The vehicle subsystem 104 includes a receiver 106 in communication with the key fob transmitter 102. The key fob transmitter 102 communicates with the receiver 106 through RF communications or otherwise. The receiver 106 is electrically connected to a control module 108. A control module 108 is also connected to one or more keypad modules 16A and 16B. Each of the keypad modules 16A and 16B and the control module are electrically connected together over a network. The control module 108 is used to control a plurality of zones. A zone is a grouping of actuators or other electronic switches associated with a vehicle and vehicle functions. For example, various switches can be used to control lighting, various actuators can be used to control locking and unlocking compartment doors or entry doors, unlocking or opening doors, or other vehicle functions. For illustrative purposes, a first zone 110 is shown containing both a switch 112 and an actuator 114. A second zone 116 is shown containing both a switch 118 and an actuator 120. A third zone 122 is shown containing an actuator 124 and a fourth zone 126 is shown containing a switch 128. The present invention contemplates numerous zones and within each zone the present invention contemplates that any number of electronic switches and/or actuators and/or other vehicle controls may be used. Entering a security code from the keypad module 16 or entering a single command from the keypad module can then control multiple vehicle functions, such as unlocking all compartment doors within a particular zone, or unlocking all entry doors within a particular zone. The following table sets forth some examples of vehicle functions that can be associated with an input:

| Connection | Vehicle function | # of inputs |
|---|---|---|
| 1 | Lock all or lock entry door zone 1 | 1 |
| 2 | Unlock all or Unlock entry door zone 1 | 1 |
| 3 | Lock zone 3 or Lock all compartments | 1 |
| 4 | Unlock zone 3 or Unlock all compartments | 1 |
| 5 | Lock zone 4 or aux input | 1 |
| 6 | Unlock zone 4 or aux input | 1 |
| 7 | Actuate Zone 6 | 1 |
| 8 | Spare Aux 1 Toggle | 1 |
| 9 | Spare Aux 2 Toggle | 1 |
| 10 | Entry door ajar | 1 |
| 11 | Compartment door ajar | 1 |
| 12 | Door trigger 3 | 1 |

Each of the keypad modules 16A and 16B can be associated with any number of vehicle functions. The present invention contemplates that upon entering a security code, preferably a five digit security code into the keypad module 16A, that entry doors or compartment doors can be unlocked. In addition, the present invention contemplates that once a security code is entered, different keypresses can control different vehicle functions. The present invention allows for the security code to be of any size that is convenient and provides appropriate security for a particular application. For example, a three digit security code is not as secure as a five digit code, but may be more convenient for an operator to remember. In addition, the present invention contemplates that numerous security code can be used. Each security code can be associated with a particular set of vehicle functions. This allows a first operator having a first security code to have more, less, or different access than a second operator having a second security code different.

The present invention provides for communication between each keypad module 16 and other devices such as control modules 108. This allows any number of keypad modules to be used and any number of control modules or other devices to be used and for all such devices to communicate with one another. Where more than one keypad module is used, the identity of each keypad module can be set with a switch or jumper, set in software, or otherwise assigned.

To provide for network communications, any number of protocols and/or message formats may be used. According to one embodiment a physical layer based on the Society of Automotive Engineers (SAE) J1708 electrical standard is used. This standard provides for serial data communications links. According to one embodiment of the present invention an AMP connector is used providing a four pin connection for power and network connections. The present invention contemplates numerous variations in the protocol used. According to one embodiment of the present invention, the messages sent begin with an 'STX' (02H) character and are transmitted at 2400 baud with 8 data bits and 1 stop bit. Various commands can then be used as may be appropriate in a particular environment or application. The commands can include commands to learn and/or change programming, commands that will change security codes, commands that will lock all doors, commands to unlock a particular zone, commands to unlock all zones, commands to toggle an auxiliary output, commands to send a pulse output, commands to change the status (for example to change between a secure mode and an unsecure mode), commands to indicate errors, and commands to issue a wakeup to particular devices.

For example, the command to learn or change programming can be a "CP." This command can be sent by any device. All devices with learning capability will go into their learn mode for their specified time limits when this command is sent.

Another command that can be sent is a change of code command. The change of code command can include the new code as well as a code checksum. Where a five digit code is used, the command string "CA#####$" can be sent to change code A. The present invention contemplates that multiple codes can be used for different keyfob transmitters 102 or keypad modules 16. The "#####" in the command string indicates the code. The "$" in the command string is used as a checksum verification of the code received. It can be calculated by adding the numeric values of the numbers in the code and then taking module 10 of that sum and converting to the ASCII equivalent. For example the code 12345 would be summed to 1+2+3+4+5=15, and mod 10 of that is 5 such that the "$" in the command string could be replaced by "5" in that instance. The present invention contemplates that other sizes of codes can be used and other or no checksums can be sued.

A further example of a command is "LA" to lock all. This command can be sent by any device. All devices that can control locks will start the process to lock all doors when this command is sent. The present invention can provide for sequentially actuating locks to avoid the increased current considerations when all locks are simultaneously actuated. Once all of the locks are considered secure, a corresponding secure status message can be sent.

Another example of a command is to unlock a particular zone. For example the command "U1" can be used to unlock zone 1. This command can be sent by any device. Any device that can control zone 1 locks will then unlock zone locks when it receives this command. An unsecure status message can sent when complete. A similar command to unlock all zones is "UA." This command can also be sent by any device and can be used to initiate the process of unlocking all doors. When any lock is considered unsecure, a corresponding unsecure status message can be sent.

An auxiliary output toggle command can be sent as "A1" by any device. Any device controlling an auxiliary output 1 can then turn the output on until a timeout occurs (if set) or until toggle off by the same command message or others. Similarly, commands "A2" through "A9" can be used to toggle auxiliary outputs 2–9.

A pulse output command can be sent as "P1" by any device. Any device controlling the corresponding pulsed output 1 can then pulse the output. Similarly, commands "P2" through "P9" can be used to pulse outputs 2–9.

Status messages are sent by control modules and not by every device. A secure mode status message such as "MS" indicates that the vehicle is secure. An unsecure mode status message such as "MU" indicates that the vehicle is not secure. The present invention contemplates that other types of status messages can be used.

The present invention also contemplates that error messages can be used. For example an "EK" can be sent to indicate that there is an error in the keypad module. An "EL" can be sent to indicate that three wrong codes have been entered. An "EC" can be sent to indicate a bad code checksum. Other error codes can be set to indicate other types of errors.

Another type of message that can be sent is a wake up message. One command string that can be used is "WU". The wake up message can be sent by any device receiving a stimulus from a user or otherwise. The "WU" can be used to cause dome lights to turn or for any number of other vehicle functions.

The present invention contemplates that the keypad module 16 can be used for any number of additional vehicle control commands. The present invention also contemplates that where multiple user codes are used, different vehicle functions can be associated with each of the multiple user codes. This allows different users to have access to different vehicle functions. Each user code can have more access, less access, or different access to vehicle functions than other user codes. For example, where the vehicle is an ambulance and has a compartment containing pharmaceuticals, a person who is only a driver for the vehicle would not need access to the compartment and therefore would not be able to unlock the compartment door using their user code. The present invention contemplates any number of examples involving any number of different vehicles, especially specialized vehicles, and any number of types of users where there is reason to provide different users with different types of access to vehicle functions. In this manner, the present invention further provides for additional customization of features by providing flexibility based on the vehicle functions of the specific vehicle and the types of users who will have access to the vehicle functions.

The present invention contemplates numerous variations in the particular vehicle functions provided, variations in the communication between the keypad modules and other devices including control modules.

In addition, the present invention contemplates variations in the number of keypad modules, the placement of keypad modules within a vehicle, the manner of fastening keypad modules to a vehicle, and the number of keys associated with a keypad module. These and other variations are well within the spirit and scope of the invention.

What is claimed is:

1. A keypad module for a vehicle entry system, comprising:

a housing having a front side, a back side, and side members, the front side having a flange adapted for mounting to a vehicle;

a plurality of buttons operatively connected to the housing and recessed in the front side of the housing;

a circuit board disposed within the housing;

a intelligent control mounted to the circuit board and electrically connected to the plurality of buttons, wherein the intelligent control is adapted to receive user input from the plurality of buttons and create a vehicle access message based in part on the user input and the vehicle access message comprising a plurality of characters; and a network transceiver electrically connected to the intelligent control, the intelligent control adapted to transmit the vehicle access message through the network transceiver to a remote location within the vehicle.

2. The keypad module of claim 1 further comprising at least one lighting device electrically connected to the intelligent control for providing visual feedback associated with a user pressing one of the plurality of buttons.

3. The keypad module of claim 2 wherein the at least one lighting device includes at least one lighting device for each of the plurality of buttons.

4. The keypad module of claim 1 further comprising an audio circuit electrically connected to the intelligent control for providing audio feedback associated with a user pressing one of the plurality of buttons.

5. The keypad module of claim 4 wherein the audio circuit includes a buzzer.

6. The keypad module of claim 1 wherein each of the plurality of buttons is press resistant to provide tactile feedback.

7. The keypad module of claim 1 wherein the vehicle access message includes a security code at least three digits in length.

8. The keypad module of claim 1 wherein the vehicle access message includes an unlock command.

9. The keypad module of claim 1 further comprising at least two apertures in the flange for accepting external fasteners to mount to the vehicle.

10. The keypad module of claim 1 further comprising graphical representations on each of the plurality of buttons.

11. The keypad module of claim 1 wherein the plurality of buttons includes five buttons.

12. The keypad module of claim 1 further comprising a sealing member between the circuit board and the housing.

13. The keypad module of claim 12 wherein the sealing member includes an elastomer membrane.

14. The keypad module of claim 1 wherein the vehicle access message comprises a command based on user input received by the plurality of buttons.

15. The keypad module of claim 14 wherein the vehicle access message further comprises a security code.

16. The keypad module of claim 14 wherein the command is to learn programming.

17. The keypad module of claim 14 wherein the command is to change programming.

18. The keypad module of claim 14 wherein the command is to lock all doors.

19. The keypad module of claim 14 wherein the command is to change security codes.

20. The keypad module of claim 14 wherein the command is to unlock a zone.

21. The keypad module of claim 14 wherein the command is to unlock all zones.

22. The keypad module of claim 14 wherein the command is to toggle an auxiliary output.

23. The keypad module of claim 14 wherein the command is to send a pulse output.

24. The keypad module of claim 14 wherein the command is to change status.

25. The keypad module of claim 14 wherein the command is to send a sustained output.

26. The keypad module of claim 14 wherein the command is to sequentially actuate a plurality of locks.

27. The keypad module of claim 1 further comprising at least one lighting device electrically connected to the intelligent control and wherein the intelligent control is programmed to control the at least one lighting device to indicate error conditions of the keypad module.

28. The keypad module of claim 1 wherein the intelligent control is further adapted to determine the status of the keypad module.

29. The keypad module of claim 1 wherein the intelligent control is programmed to verify at least one security code.

30. The keypad module of claim 1 wherein the intelligent control is programmed to associate a plurality of codes for controlling vehicle functions with each of the at least one security code.

31. The keypad module of claim 30 wherein the at least one security code is a plurality of security codes and wherein each of the plurality of security codes is associated with a separate plurality of codes for controlling vehicle functions.

32. A keypad module for a vehicle entry system, comprising:

a housing having a front side, a back side, and side members, the front side having a flange adapted for mounting to a vehicle;

a plurality of buttons operatively connected to the housing and recessed in the front side of the housing, each of the plurality of buttons dented such that a user receives tactile feedback;

a circuit board disposed within the housing;

a intelligent control mounted to the circuit board and electrically connected to the plurality of buttons;

a network transceiver electrically connected to the intelligent control, the intelligent control adapted to transmit a vehicle access message through the network transceiver, the vehicle access message based in part on input from the user received through the plurality of buttons and the vehicle access message comprising a plurality of characters;

at least one lighting device electrically connected to the intelligent control for providing visual feedback associated with each of the plurality of buttons; and a audio circuit electrically connected to the intelligent control for providing audio feedback associated with a user pressing one of the plurality of buttons.

33. The keypad module of claim 32 wherein the vehicle access message includes a security code.

34. The keypad module of claim 33 wherein the security code is at least three digits in length.

35. The keypad module of claim 32 wherein the vehicle access message includes an unlock command.

36. A method for providing secured access to a vehicle with a keypad module operatively connected to the vehicle, the keypad module having a plurality of buttons, the method comprising:

receiving a user selection of at least one button;

providing tactile, visual, and audio feedback to the user of the user selection;

generating a security code at least partially based on the user selection;

generating a vehicle access message by the keypad module, the vehicle access message comprising a plurality of characters and including a command;

sending the vehicle access message over a network to a remote device within the vehicle.

37. The method of claim 36 wherein the vehicle command is selected from a set comprising a learn programming command, a change programming command, a lock all doors command, a change security codes command, an unlock a zone command, an unlock all zones command, a toggle an auxiliary output command, a send a pulse output command, send a change status command, send a sustained output command, and a sequentially actuate a plurality of locks command.

38. The method of claim 36 wherein the vehicle access message further comprises the security code.

39. An access module for use in a vehicle access system having at least one control module and adapted for network communications with the at least one control module, comprising:

a housing adapted for mounting to a vehicle;

at least one user input operatively connected to the housing;

a intelligent control disposed within the housing and electrically connected to the at least one user input;

a network transceiver disposed within the housing and electrically connected to the intelligent control;

wherein the intelligent control is adapted to selectively transmit one of a plurality of vehicle access messages through the network transceiver to the at least one control module at least partially based upon input received from the user input;

wherein the plurality of vehicle access messages includes at least one command string to control at least one vehicle function of the vehicle; and wherein each of the plurality of vehicle access messages comprises a plurality of characters.

40. The access module of claim 39 wherein the intelligent control is adapted to receive at least one of the plurality of vehicle access messages from a second access module.

41. The access module of claim 39 wherein the intelligent control is adapted to receive a change access code command from the at least one user input.

42. The access module of claim 39 wherein the one of the plurality of vehicle access messages includes an access module identifier.

43. The access module of claim 39 wherein the intelligent control is adapted to receive a security code received from the at least one user input.

44. The access module of claim 43 wherein the intelligent control is further adapted to receive an access code for performing the at least one vehicle function.

45. The access module of claim 44 wherein the intelligent control is further adapted to determine if the security code allows for control of the at least one vehicle function associated with the access code and if true, sending at least one command string to perform the at least one vehicle function.

* * * * *